US011049496B2

(12) United States Patent
Velayutham et al.

(10) Patent No.: US 11,049,496 B2
(45) Date of Patent: Jun. 29, 2021

(54) AUDIO PIPELINE FOR SIMULTANEOUS KEYWORD SPOTTING, TRANSCRIPTION, AND REAL TIME COMMUNICATIONS

(71) Applicant: Microsoft Technology Licensing, LLC, Redmond, WA (US)

(72) Inventors: Senthil Velayutham, Sammamish, WA (US); Sriram Srinivasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 16/203,963

(22) Filed: Nov. 29, 2018

(65) Prior Publication Data
US 2020/0175966 A1     Jun. 4, 2020

(51) Int. Cl.
*G10L 15/08*     (2006.01)
*G10L 15/26*     (2006.01)
*G10L 21/0208*     (2013.01)

(52) U.S. Cl.
CPC .............. *G10L 15/08* (2013.01); *G10L 15/26* (2013.01); *G10L 21/0208* (2013.01); *G10L 2015/088* (2013.01); *G10L 2021/02082* (2013.01)

(58) Field of Classification Search
CPC .......... G10L 15/00–15/34; G10L 2021/02082
See application file for complete search history.

(56) References Cited

U.S. PATENT DOCUMENTS 9,691,378 B1 *   6/2017   Meyers .................. G10L 15/04
9,728,188 B1     8/2017   Rosen et al.
10,079,015 B1 *   9/2018   Lockhart ................ G10L 15/22

OTHER PUBLICATIONS

"International Search Report and Written Opinion Issued in PCT Application No. PCT/US2019/061566", dated Jan. 28, 2020, 22 Pages.

* cited by examiner

*Primary Examiner* — Abul K Azad
(74) *Attorney, Agent, or Firm* — Schwegman Lundberg & Woessner, P.A.

(57) ABSTRACT

Disclosed in some examples, are methods, systems, and machine-readable mediums for preventing unintended activation of voice command processing of a voice activated device. A first audio signal may be an audio signal that is to be output to a speaker communicatively coupled to the computing device. A second audio signal may be input from a microphone or other audio capture device. Both audio signals are input to a keyword detector to check for the presence of activation keywords. If the activation keyword(s) are detected in the second audio signal but not the first audio signal the voice command processing of the device is activated as this is likely a command from the user and not feedback from the loudspeaker.

21 Claims, 5 Drawing Sheets

AUDIO PIPELINE FOR SIMULTANEOUS KEYWORD SPOTTING, TRANSCRIPTION, AND REAL TIME COMMUNICATIONS

BACKGROUND

The popularity of computing devices with user interfaces using voice recognition has exploded in recent years as the technology to recognize a human user's voice and understand commands has become more sophisticated. Computing devices with voice recognition systems use audio capture devices (such as a microphone) to capture speech of a user. The captured speech is then processed by the computing device to recognize one or more commands in the speech. These commands are then translated into computerized tasks. Example tasks may include ordering products from an online store, scheduling appointments in a computerized calendar application, searching the Internet, and the like. Some example user interfaces employing voice recognition include software-based personal assistants such as CORTANA® from MICROSOFT®, SIRI® from APPLE®, ALEXA® from AMAZON®, or the GOOGLE ASSISTANT® from GOOGLE®. Another example voice recognition technology is voice dictation where a user talks into a microphone and the computing device translates the captured audio into editable text in a word processing program.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

When utilizing voice recognition applications, a user speaks into a microphone or other sound capture device that is communicatively coupled to the computing device. Other sounds in the room, including sounds being played by the computing device itself, such as music, video, or audio from a communication event may be picked up by the microphone. To prevent these noises from unintentionally activating the voice control features of the computing device, the voice command functions are typically only activated upon detection of one or more activation keywords. For example, the CORTANA® computerized personal assistant is activated by the keywords "Hey Cortana," being detected in the input audio. The audio following the keywords is then interpreted by CORTANA® as a command.

Despite the use of activation keywords to guard against unintended activations, this is not always enough to prevent unintended activations. For example, if a first user is conducting an online meeting and a second user that is a remote participant wishes to activate their own computerized personal assistant, the second user may speak the activation keywords intending to activate only their personal computer assistant. If the second user does not mute themselves in the online meeting before speaking the activation keywords, the activation keywords may be played through the first user's speakers and may be picked up by the first user's microphone. This may unintentionally activate the first user's computerized personal assistant. This may lead to unintended actions being taken that are not in accordance with the wishes of the first user. In some cases, this may be prevented using echo cancellers. Echo cancellers may not be practical in all situations as they reduce sound quality and tend to make detection of the activation keywords and the following commands more difficult.

Aside from inadvertent activations, researchers have found innovative ways to hide activation commands in music that cause computerized personal assistants to execute unintended commands. In some cases, these commands are inaudible to the human ear. Researchers have surreptitiously made these computerized personal assistants dial phone numbers, open websites, order products, and execute other commands. This presents a serious security risk as well as an inconvenience to the user to cancel unintended commands.

Disclosed in some examples, are methods, systems, and machine-readable mediums for preventing unintended activation of voice command processing of a voice activated device. In some examples, a first audio signal generated or received by the computing device and a second audio signal from an audio input device (e.g., a microphone) coupled to the computing device are both submitted to a keyword detector. The first audio signal may be a signal from a media player such as a music player, video player, and the like; a communications application such as an online meeting application or a Voice over Internet Protocol (VoIP) application; a video game; or other applications that generate audio. The first audio signal may be an audio signal that is to be output by an output device such as a speaker communicatively coupled to the computing device). The second audio signal may be input from a microphone or other audio capture device. Both audio signals are input to a keyword detector to check for the presence of activation keywords.

If the activation keyword(s) are detected in the second audio signal but not the first audio signal the voice command processing of the device is activated as this is likely a command from the user and not feedback from the loudspeaker. If the activation keyword(s) are detected in the first audio signal but not the second audio signal, the voice command processing functions are not activated (e.g., voice activation may be inhibited). Where the activation keyword(s) are detected in the first signal but not the second signal, the computing device may determine that echo cancellation is on and has suppressed the feedback. The computing device may utilize the determination that echo cancellation is active to adjust one or more digital signal processing (DSP) settings of one or more applications to enhance sound quality to compensate for the echo cancellation. If the activation keyword(s) are not detected in either signals, then the voice command processing may not be activated.

If the activation keyword(s) are detected in both audio signals, in some examples, the voice command processing of the device may not be activated (e.g., voice activation is inhibited) as the keywords in the input may be caused by either feedback of the first audio signal into the microphone or by simultaneous speaking of the activation keywords by both the local user and the remote user. In some examples, the latter case may be considered rare and so may be ignored (e.g., the voice command processing may not be activated, and the user may have to speak the activation keywords again). In other examples, the system may handle simultaneous (or near simultaneous) activation keyword utterances by utilizing received metadata about the first audio signal. For example, if the first audio signal is received from a remote participant in an online communication session, the remote computing device may send the results of keyword detection performed locally on that device as metadata along with the audio signal. That is, the remote participant's computing device is also checking for the activation keywords in the audio signal input to the audio input device and includes those results in the audio sent to the remote participants. In this example, the metadata may include the keyword(s) detected and the timestamp at which the keyword was detected. This will allow the system to differentiate between activation keywords detected in a first audio signal and activation keywords detected in a second audio signal by comparing the timestamps at which the keywords were detected in the first signal and compare that to when the keywords were detected in the second signal. Typical feedback loops would have a characteristic delay window. If the keywords were detected in the first audio signal and the second audio signal at the same time, or outside the characteristic delay window, then the voice command processing may be activated, otherwise the voice command processing may not be activated.

In addition, the metadata may include the keywords that were detected. For example, if the activation keywords detected in the first audio signal and the second audio signal were different—for example, if the local user and remote user use different computerized assistants—then the voice command processing may be activated. In further examples, the metadata may also include voice characteristic information for the detected activation keywords. The voice characteristic information may be used by the local device to determine if the voice characteristics of the keywords detected in the second audio signal are the same or different than the audio characteristics detected in the keywords in the first audio signal. If the voice characteristics are the same, then it is more likely that the keywords detected in the second audio signal are feedback from the first and thus the voice command processing may not be activated. If the voice characteristics are different, then it is more likely that both the local user and remote user were attempting to activate the voice command processing on their respectively devices at the same time.

As noted previously, previous solutions to the problem of unintentional activation of a voice activated devices by output audio signals have utilized an echo canceller. In some instances, this echo cancellation is undesirable as it may lower sound quality and it may lower keyword detection accuracy. The present invention thus solves the problem of unintended activation of a voice activated computing device without affecting the accuracy of the keyword detection as well as command recognition (e.g., recognizing the command coming after the keyword detection). This problem is solved by intelligently activating the voice activation functions based upon which of the output and input signals contain the keywords. This solution does not rely upon modifications to the input audio signal and so there is no loss of fidelity and consequential drop in keyword detection accuracy as there are with echo cancellers. Furthermore, the present solution uses a dual pipeline for each audio signal that allows the keyword detection to prevent the addition of any latencies that may be introduced by the keyword detector and ultimately the voice command processing.

Figure 1:
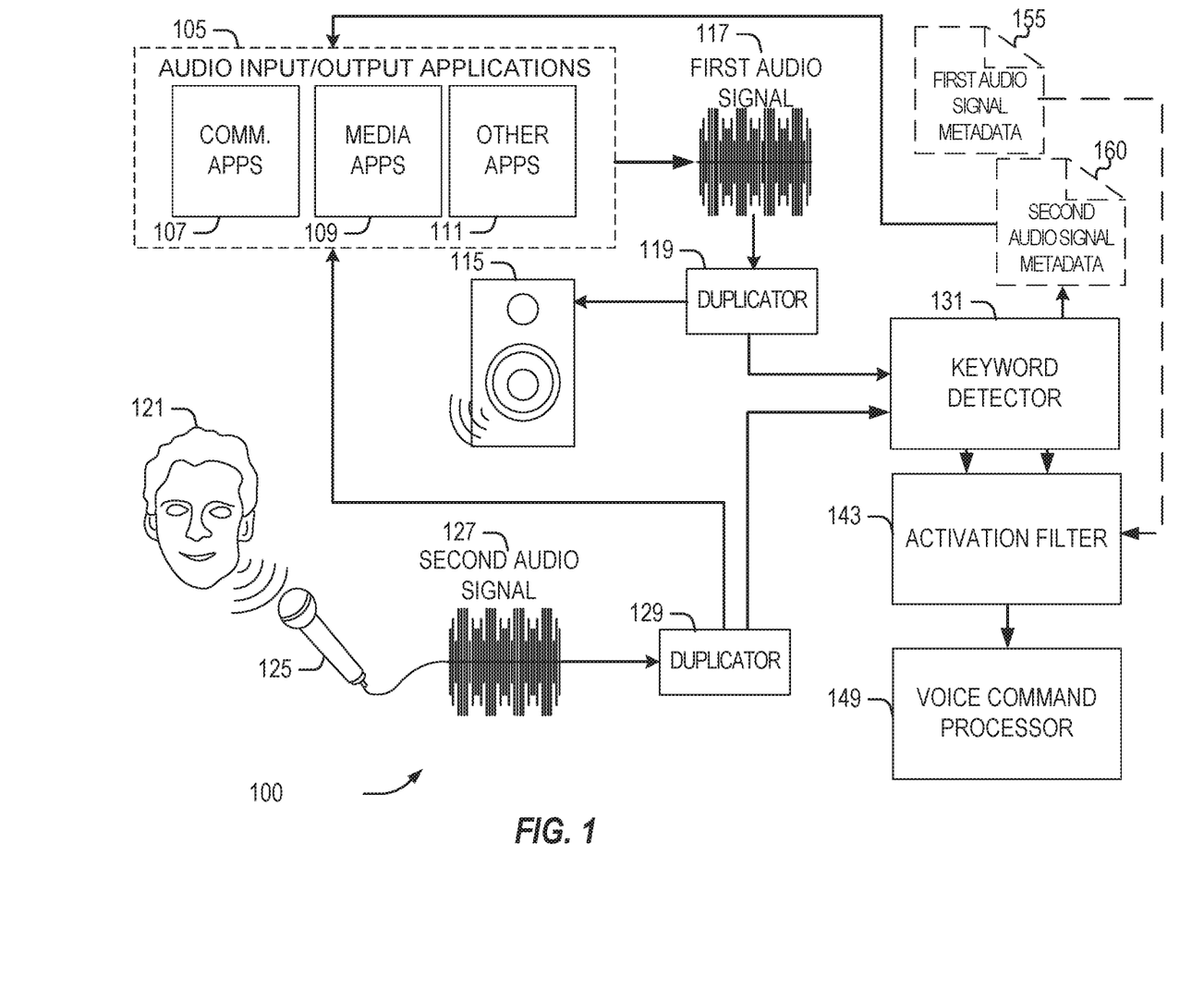
FIG. 1 illustrates a schematic of an example system including components to prevent unintended activation of a voice activated device according to some examples of the present disclosure.

FIG. 1 shows a schematic of an example system 100 including components to prevent unintended activation of a voice activated device according to some examples of the present disclosure. A computing device may execute one or more components such as audio input/output applications 105, a duplicator 119, a duplicator 129, a keyword detector 131, an activation filter 143, and a voice command processor 149. In some examples, one or more of the keyword detector 131, activation filter 143, and/or the voice command processor 149 may be a network-based service that may be communicatively reachable by the computing device via a computer network. The voice command processor 149 may execute one or more voice activated functions, for example by transcribing the second audio signal 127 and then executing an appropriate command based upon the transcribed audio signal. Voice activated functions may be associated with one or more different applications, such as a computerized personal assistant. Example voice activated functions include searching the Internet, searching for files, requesting information, setting calendar dates and reminders, ordering products, translating speech into a word processing document, activating hardware of the device, activating programs on the device, and the like.

The computing device may include or be communicatively coupled to speaker 115 and microphone 125. A first audio signal 117 may be generated and/or received from a variety of audio input/output applications 105 that may execute on the computing device. In one example audio input and output application may include a communication application 107. Communication application 107 may provide for online meetings, voice communications (such as Voice over Internet Protocol (VOIP) communications) and the like. Example communications applications may include MICROSOFT TEAMS®, MICROSOFT SKYPE®, MICROSOFT SKYPE FOR BUSINESS®, AMAZON CHIME®, GOOGLE VOICE®, ZOOM®, BAIDU®, and the like.

Audio input/output applications 105 may also include media applications 109 which may play or edit audio, video, or the like. Example media applications may include WINDOWS MEDIA PLAYER®, VLC MEDIA PLAYER®, and the like. Media applications 109 may also include web browsers that may play media content, such as MICROSOFT EDGE®, GOOGLE CHROME®, APPLE SAFARI® and the like. Audio input/output applications 105 may also include other applications 111 that may include any other application that plays, records, or utilizes audio or video content. Examples may include video games, productivity applications, presentation applications, and the like. The first audio signal 117 may be audio output from the audio input/output applications 105. For example, online meeting content, which may include voice content received from one or more remote participants.

First audio signal 117 may be duplicated by duplicator 119. One copy of the audio signal may be sent to an output device audio pipeline that may be ultimately output to an output device such as a speaker 115. Another copy may be sent to a voice command pipeline that may comprise a keyword detector 131, activation filter 143 and voice command processor 149. Similarly, a user 121 may speak into a microphone 125 (or other audio capture device) that captures the audio to produce a second audio signal 127. Second audio signal 127 may also duplicated using a duplicator 129. Duplicator 119 and 129 may be the same or a different duplicator. One copy of the duplicated second audio signal 127 may be sent as input to an application pipeline, such as a pipeline for one or more of the audio input/output applications. For example, as audio for an online meeting of a communication application 107. The other copy of the duplicated second audio signal may be sent to the voice command processing pipeline starting with the keyword detector 131.

Duplicators 119 and 129 may be used to avoid any latency that may be introduced by the keyword detector 131 in processing the audio signals and to provide for the ability to process the audio signals differently to optimize each copy for specific uses. For example, audio for real time communications may be processed in a manner that is more geared toward human intelligibility. However, the processing done to achieve this goal may compromise the detectability of the speech for the voice command processor 149. By using two pipelines for the first audio signal, the system may process one copy of the audio signal for human intelligibility and one copy for speech recognition.

Keyword detector 131 may sample the first audio signal 117 and second audio signal 127 over a defined period of time (e.g., a number of seconds, milliseconds, microseconds, or the like) to parse the audio signals for recognized speech and determine whether any speech contains activation keywords. Keyword detector 131 may output an indication of whether the activation keywords were detected in the audio signals. In some examples, the keyword detector 131 may also output the indication whether the second audio signal 127 contained activation keywords as second audio signal metadata 160 to the audio input/output applications 105 which may send the indication as metadata to other computing devices (which may use this metadata as metadata 155 is used as described below). In some examples, the metadata may include the actual activation keywords detected, timestamps of when the keywords are detected, and/or voice characteristics.

Activation filter 143 may utilize the indications output by the keyword detector 131, and in some examples, the first audio signal metadata 155 (provided by a remote computing device with the first audio signal 117), to determine whether the voice command processor 149 should be activated. For example, activation filter 143 may employ the method shown in FIG. 4. Activation filter 143 may send an activation signal and second audio signal 127 to the voice command processor 149 if the activation filter 143 determines that the voice command processor should be activated based upon the indications of whether the activation keyword(s) were present in both the first audio signal 117 and second audio signal 127.

Once activated, the voice command processor 149 may transcribe the audio signal, and based upon the transcription, execute one or more voice commands on the computing device to perform various functions based upon the voice commands. In some examples, the voice command processor utilizes a same or similar functionality as the keyword detector in determining a content of speech of the second audio signal 127 (e.g., in determining the user's spoken command after the activation keywords in the second audio signal 127). For example, the audio coming after "Hey Cortana" represents the requested command. In other examples, the keyword detector 131 may be a specialized component for detecting keywords that may be less processor intensive and faster to prevent any performance degradation from running a full voice recognition module (such as may be implemented by the voice command processor).

The example of FIG. 1 used duplicators 119 and 129 to both avoid any latency that may be introduced by the keyword detector 131 in processing the audio signals and also to provide for the ability to process the audio signals so as to optimize them for each specific use. In other examples, the duplicators may not be used, and the streams may be processed by the keyword detector 131 prior to being output to the speaker 115 (or other output device) and prior to submission to the audio input/output applications 105. Additionally, the example of FIG. 1 shows two audio signals—first audio signal 117 and second audio signal 127—one audio signal that is to be output from an output device and one audio signal that is received from an audio capture device as input, respectively. It will be appreciated by one of ordinary skill in the art that multiple input and output audio signals may be processed using the disclosed techniques to prevent unintended voice activation. The components of FIG. 1, including the keyword detector 131, activation filter 143, voice command processor 149, duplicator 129 and 119 may be implemented in software, hardware, or a combination of software and hardware.

Figure 2:
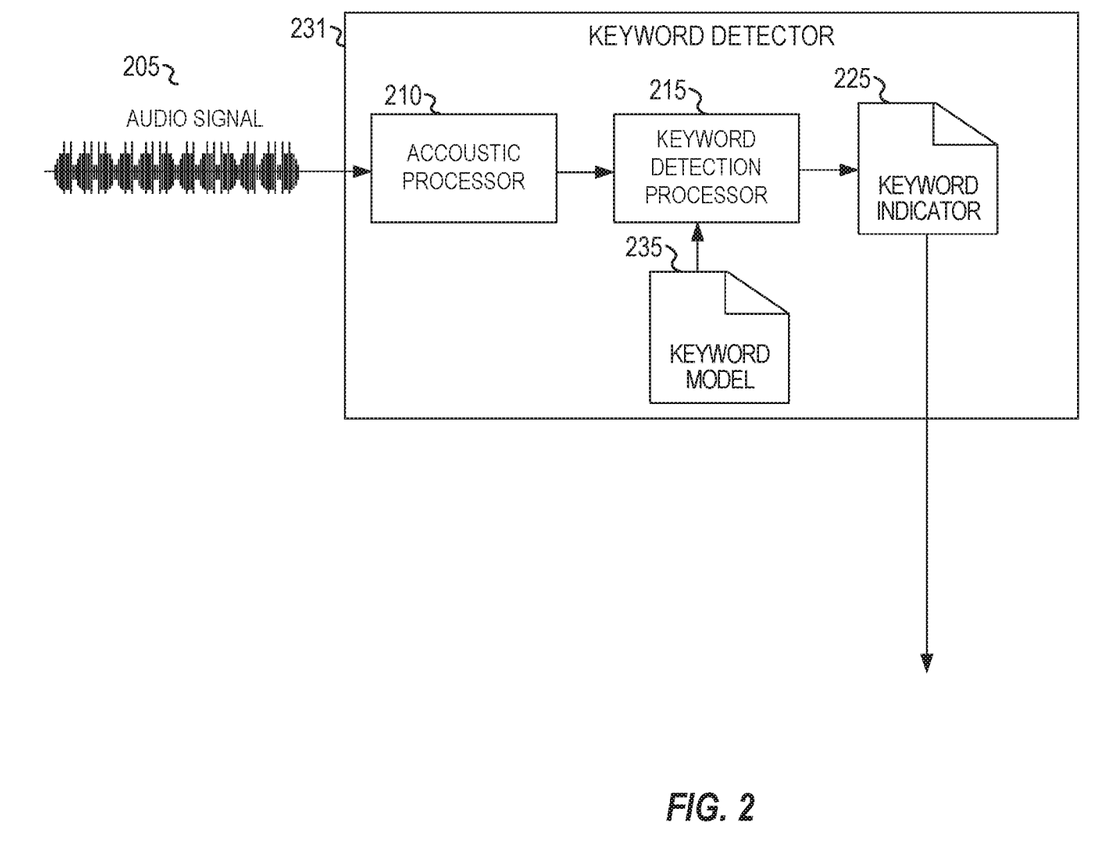
FIG. 2 illustrates a block diagram of a keyword detector according to some examples of the present disclosure.

FIG. 2 shows a block diagram of a keyword detector 231 according to some examples of the present disclosure. Keyword detector 231 may be implemented in hardware, software, or a combination of hardware and software. Keyword detector 231 may be an example of keyword detector 131. Keyword detector 231 may include an acoustic processor 210 that may process an audio signal 205 (which may be first audio signal 117 and second audio signal 127 from FIG. 1) to optimize the audio signal 205 for use in the keyword detection processor 215. For example, the acoustic processor 210 may adjust one or more audio properties such as gain, balance, equalizer levels, and the like to optimize the audio signal. In some examples, the acoustic processor 210 may calculate one or more features of the audio signal 205, such as a mel-frequency cepstrum coefficients (MFCC) which may be used by the keyword detection processor 215.

Keyword detection processor 215 is configured to detect one or more activation keywords in the processed audio signal. In some examples, the keyword detection processor utilizes a machine-learned keyword model 235. For example, the keyword detection processor 215 may be a convolutional neural network that utilizes mel-frequency cepstrum coefficients (calculated by the acoustic processor 210) to detect one or more activation keywords. The keyword model 235 may represent one or more weights and/or parameters of the model that is then used by the keyword detection processor 215 to implement the model. The keyword model 235 may be trained in an offline manner using supervised or unsupervised machine learning approaches using training data. For supervised approaches the training data may be labeled as including or not including activation keywords. The output of the keyword detection processor 215 may be a keyword indicator 225 of whether the activation keywords were detected in the audio signal 205. In some examples, the keyword detector may also output metadata such as the timestamp of when the activation keywords were detected, voice characteristics of the speaker, and the like.

Figure 3:
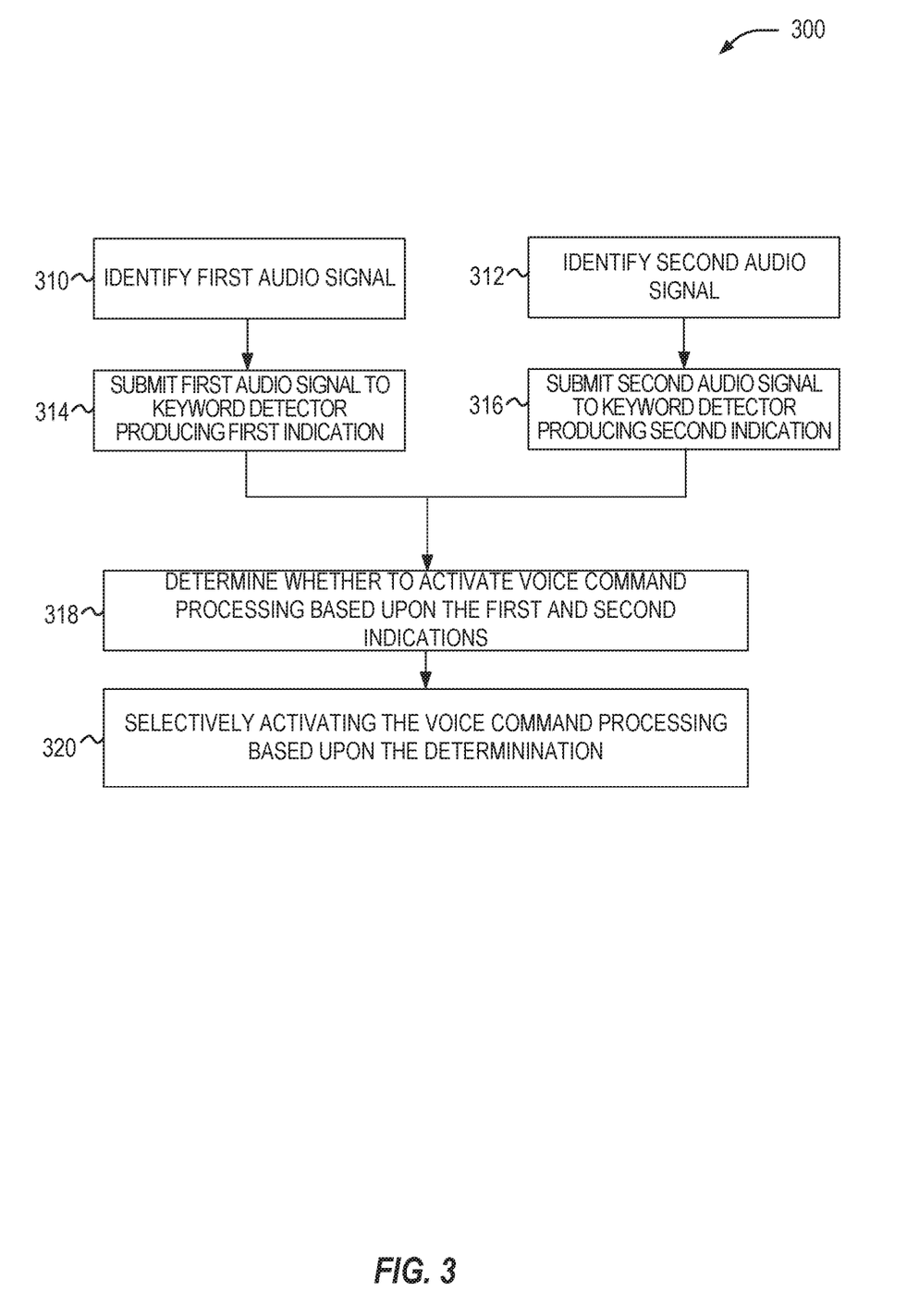
FIG. 3 illustrates a flowchart of a method of preventing unintended voice activation according to some examples of the present disclosure.

FIG. 3 illustrates a flowchart of a method 300 of preventing unintended voice activation according to some examples of the present disclosure. At operation 310 a first audio signal is identified. The first audio signal may be one or more audio signals received or produced by the computing device. The first audio signal may be audio received by a communications application, generated by a media player application, or the like. This audio signal is submitted to the keyword detector at operation 314. The keyword detector (e.g., keyword detector 131 and 231) may output a first indication as to whether one or more activation keywords are present in the first audio signal. Simultaneously, or sequentially to the submission of the first audio signal to the keyword detector, a second audio signal is identified at operation 312 and submitted to the keyword detector at operation 316 to produce a second indication as to whether one or more activation keywords are present in the first audio signal. The second audio signal may be one or more input audio signals from one or more audio capture devices. In some examples, multiple instances of the keyword detector may be used in parallel, or the signals may be fed to a single instance of the keyword detector in serial.

At operation 318, the system determines whether to activate the voice command processing via voice activation based upon the first and second indications. Voice command processing is the processing that takes place to recognize a command in audio and to execute the command. In some examples, if the second indication indicates that the keywords were present, and the first indication indicates that the keywords were not present, then the voice command processing is activated. For example, a computerized personal assistant is activated and will respond to commands uttered after the keywords.

If the second indication indicates that the keywords were present and the first indication indications that the keywords were present, then in some examples, the voice command processing is not activated as it signals that the output audio was captured through the sound capture device. In other examples, as noted above, metadata sent from a remote computing device may be utilized to determine whether to activate the voice command processing. For example, if the metadata indicates that no activation keywords were detected in the audio sent from the remote computing device, then the voice command processing may be activated. If the metadata indicates that activation keywords were detected in the audio sent from the remote computing device, then voice command processing may be activated if the timestamp indicates that the keywords occurred outside a characteristic feedback window. In some examples, rather than submit both audio signals (e.g., the first audio signal 117 and second audio signal 127 in FIG. 1) locally, only the second audio signal 127 may be submitted locally and the results of the remote keyword detector (sent as meta data with the first audio signal 117) may be used in place of the keyword detector's 131 analysis of first audio signal 117.

If the second indication indicates that the keywords were not present and the first indication indicates that the keywords were present, then the voice command processing is not activated. This scenario is also an indicator that the input device is employing echo cancellation. Knowing that the input device is employing echo cancellation allows the computing device to adjust digital signal processing (DSP) settings to improve keyword detection performance as well as overall sound quality as well as allow one or more of the applications to turn off its own echo canceller. For example, communication applications typically have their own echo cancellation algorithms (since they cannot rely on those algorithms being present in the system). Applying a second echo canceller in tandem (e.g., one on the system and the other in the application) degrades quality. By knowing if echo cancellation is already active, the application can turn off its own echo canceller—or prevent it from being activated. If the second indication indicates that the keywords were not present and the first indication indicates that the keywords were not present, then the voice command processing is not activated.

At operation 320, the voice command processing may be selectively activated based upon the determination. If it is determined that the voice command processing is to be activated, then at operation 320 the voice command processing is activated. If the it is determined that the voice command processing is not to be activated, then at operation 320 the voice command processing is not activated.

Figure 4:
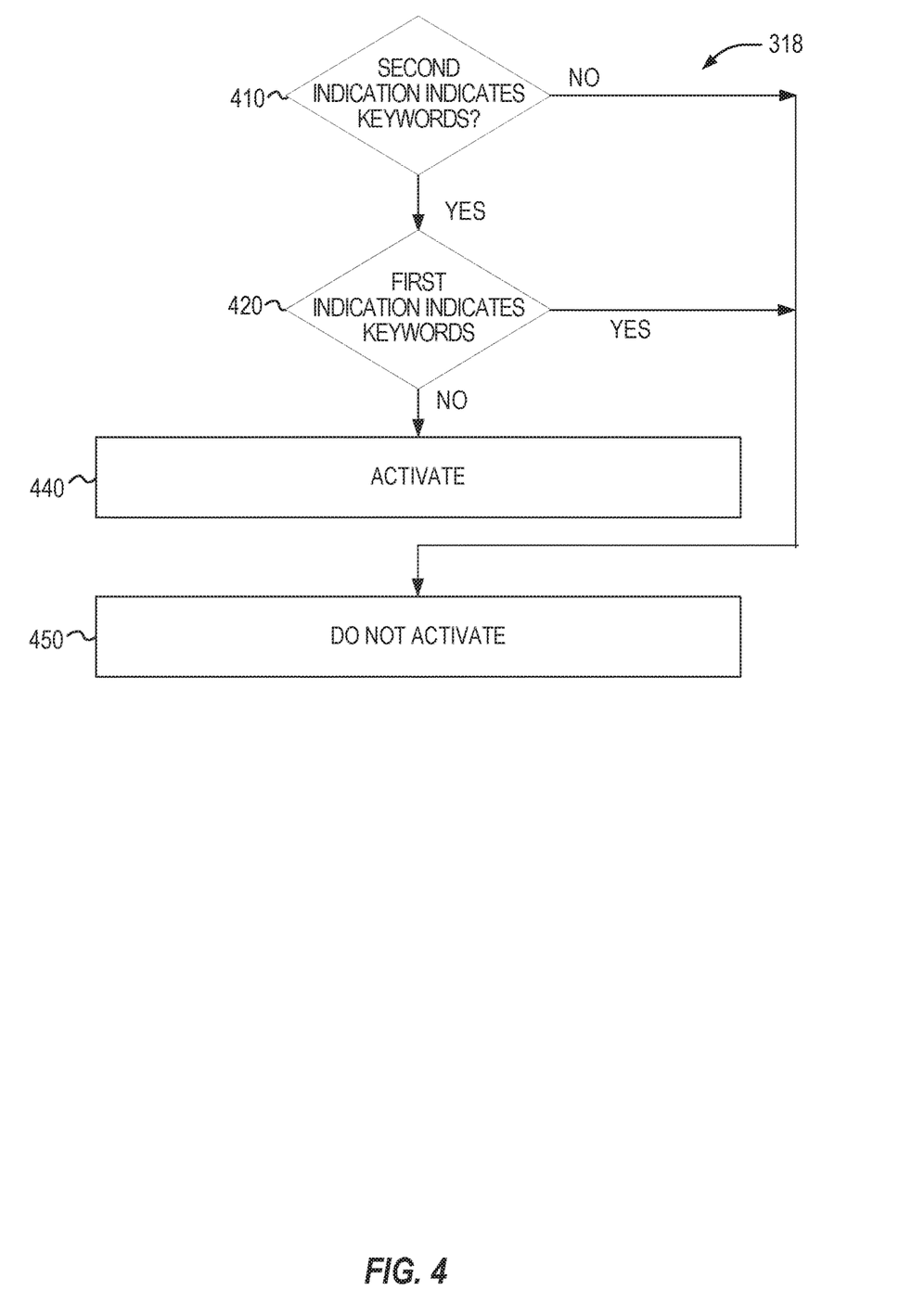
FIG. 4 illustrates a flowchart of a method of determining whether to activate voice command processing is shown according to some examples of the present disclosure.

Turning now to FIG. 4, a flowchart of a method of performing operation 318 is shown according to some examples of the present disclosure. At operation 410 if the second indication does not indicate the presence of the one or more activation keywords, then the determination is made at operation 450 not to activate the voice command processing. If the second indication indicates the presence of the activation keywords, then at operation 420 it is determined if the first indication indicates the presence of the activation keywords. If the first indication indicates the presence of the activation keywords, then at operation 450, the voice command processing functions are not activated. If the first indication indicates that the activation keywords are not present, then the voice command processing functions are activated at operation 440. As noted previously, in some examples if both the first and second indications indicates that keywords were detected, the metadata sent from the remote communication device may be utilized to make a determination of whether to activate the voice command processing.

Figure 5:
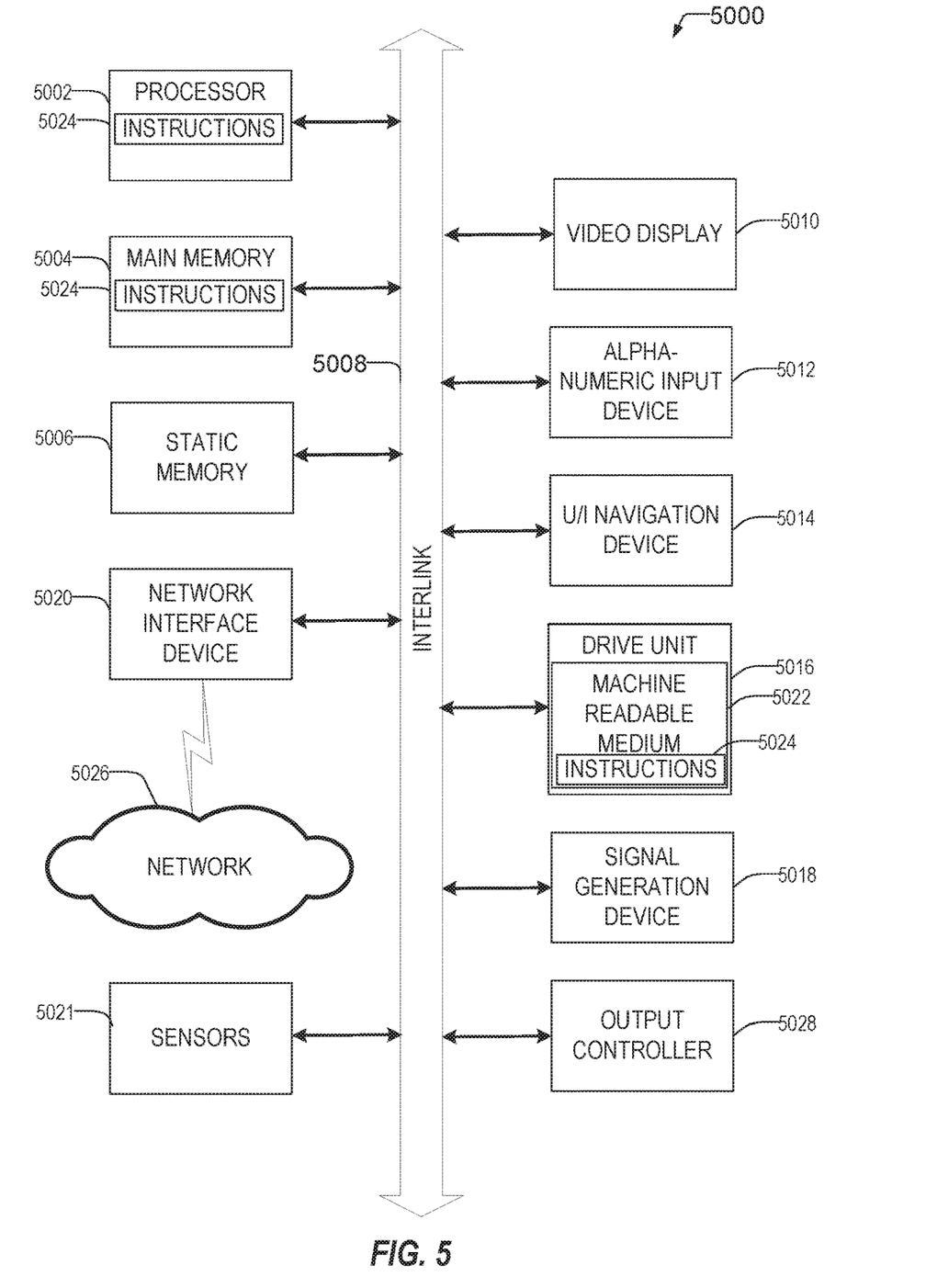
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 500 may be a computing device that may implement the systems of FIGS. 1 and 2 and perform the methods of FIGS. 3 and 4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

OTHER NOTES AND EXAMPLES

Example 1 is a method for verifying an intent of a user to activate voice command processing of a device, the method comprising: using one or more processors of a computing device: submitting a first audio signal to a keyword detector, the keyword detector producing a first indication of whether one or more words designed to activate the voice command processing are present in the first audio signal; submitting a second audio signal, received from an audio capture device communicatively coupled to the computing device, to the keyword detector producing a second indication of whether the one or more words designed to activate the voice command processing is present in the second audio signal; determining whether to activate the voice command processing based upon both the first and second indications of whether the one or more words are present; and selectively activating the voice command processing of the device based upon the determination.

In Example 2, the subject matter of Example 1 includes, wherein the first audio signal is audio from a communications application that originated from one or more remote participants.

In Example 3, the subject matter of Examples 1-2 includes, wherein the first audio signal is copied and wherein a first copy is submitted to the keyword detector and the second copy is caused to be played through an output device communicatively coupled to the computing device.

In Example 4, the subject matter of Examples 1-3 includes, wherein determining whether to activate the voice command processing based upon both the first and second indications comprises: activating the voice command processing when the first indication indicates that the one or more words were not present and the second indication indicates that the one or more words were present.

In Example 5, the subject matter of Examples 1-4 includes, wherein determining whether to activate the voice command processing based upon both the first and second indications comprises: refraining from activating the voice command processing when the first indication and the second indication both indicate that the one or more words were present.

In Example 6, the subject matter of Examples 1-5 includes, wherein determining whether to activate the voice command processing based upon both the first and second indications comprises: refraining from activating the voice command processing when the first indication indicates that the one or more words were present and the second indication indicates that the one or more words were not present.

In Example 7, the subject matter of Example 6 includes, determining, based upon the first indication indicating that the one or more words were present and the second indication indicating that the one or more words were not present, that an echo canceller is active; and responsive to determining that the echo canceller is active, adjusting a digital signal processing setting of a communications application to compensate for the echo canceller.

In Example 8, the subject matter of Examples 1-7 includes, wherein the first audio signal is sent to an output device communicatively coupled to the one or more processors and the second audio signal is received from an input device communicatively coupled to the one or more processors.

Example 9 is a computing device that verifies an intent of a user to activate voice command processing of the computing device, the computing device comprising: a processor; a memory comprising instructions, which when executed by the processor, causes the processor to perform operations comprising: submitting a first audio signal to a keyword detector, the keyword detector producing a first indication of whether one or more words designed to activate the voice command processing are present in the first audio signal; submitting a second audio signal, received from an audio capture device communicatively coupled to the computing device, to the keyword detector producing a second indication of whether the one or more words designed to activate the voice command processing is present in the second audio signal; determining whether to activate the voice command processing based upon both the first and second indications of whether the one or more words are present; and selectively activating the voice command processing of the computing device based upon the determination.

In Example 10, the subject matter of Example 9 includes, wherein the first audio signal is audio from a communications application that originated from one or more remote participants.

In Example 11, the subject matter of Examples 9-10 includes, wherein the operations further comprise copying the first audio signal and submitting a first copy to the keyword detector and a second copy is caused to be played through an output device communicatively coupled to the computing device.

In Example 12, the subject matter of Examples 9-11 includes, wherein the operations of determining whether to activate the voice command processing based upon both the first and second indications comprises: activating the computing device when the first indication indicates that the one or more words were not present and the second indication indicates that the one or more words were present.

In Example 13, the subject matter of Examples 9-12 includes, wherein the operations of determining whether to activate the voice command processing based upon both the first and second indications comprises: refraining from activating the voice command processing when the first indication and the second indication both indicate that the one or more words were present.

In Example 14, the subject matter of Examples 9-13 includes, wherein the operations of determining whether to activate the voice command processing based upon both the first and second indications comprises: refraining from activating the voice command processing when the first indication indicates that the one or more words were present and the second indication indicates that the one or more words were not present.

In Example 15, the subject matter of Example 14 includes, wherein the operations further comprise: determining, based upon the first indication indicating that the one or more words were present and the second indication indicating that the one or more words were not present, that an echo canceller is active; and responsive to determining that the echo canceller is active, adjusting a digital signal processing setting of a communications application to compensate for the echo canceller.

In Example 16, the subject matter of Examples 9-15 includes, wherein the operations further comprise sending the first audio signal to an output device communicatively coupled to the computing device and receiving the second audio signal from an input device communicatively coupled to the one or more processors.

Example 17 is a machine-readable medium comprising instructions for verifying an intent of a user to activate voice command processing of a machine, the instructions, when executed by a machine, cause the machine to perform operations comprising: submitting a first audio signal to a keyword detector, the keyword detector producing a first indication of whether one or more words designed to activate the voice command processing are present in the first audio signal; submitting a second audio signal, received from an audio capture device communicatively coupled to the computing device, to the keyword detector producing a second indication of whether the one or more words designed to activate the voice command processing is present in the second audio signal; determining whether to activate the voice command processing based upon both the first and second indications of whether the one or more words are present; and selectively activating the voice command processing of the machine based upon the determination.

In Example 18, the subject matter of Example 17 includes, wherein the first audio signal is audio from a communications application that originated from one or more remote participants.

In Example 19, the subject matter of Examples 17-18 includes, wherein the operations further comprise copying the first audio signal and submitting a first copy to the keyword detector and a second copy is caused to be played through an output device communicatively coupled to the machine.

In Example 20, the subject matter of Examples 17-19 includes, wherein the operations of determining whether to activate the voice command processing based upon both the first and second indications comprises: activating the voice command processing when the first indication indicates that the one or more words were not present and the second indication indicates that the one or more words were present.

In Example 21, the subject matter of Examples 17-20 includes, wherein the operations of determining whether to activate the voice command processing based upon both the first and second indications comprises: refraining from activating the voice command processing when the first indication and the second indication both indicate that the one or more words were present.

In Example 22, the subject matter of Examples 17-21 includes, wherein the operations of determining whether to activate the voice command processing based upon both the first and second indications comprises: refraining from activating the voice command processing when the first indication indicates that the one or more words were present and the second indication indicates that the one or more words were not present.

In Example 23, the subject matter of Example 22 includes, wherein the operations further comprise: determining, based upon the first indication indicating that the one or more words were present and the second indication indicating that the one or more words were not present, that an echo canceller is active; and responsive to determining that the echo canceller is active, adjusting a digital signal processing setting of a communications application to compensate for the echo canceller.

In Example 24, the subject matter of Examples 17-23 includes, wherein the operations further comprise sending the first audio signal to an output device communicatively coupled to the machine and receiving the second audio signal from an input device communicatively coupled to the machine.

Example 25 is a computing device that verifies an intent of a user to activate voice command processing of the computing device, the computing device comprising: means for submitting a first audio signal to a keyword detector, the keyword detector producing a first indication of whether one or more words designed to activate the voice command processing are present in the first audio signal; means for submitting a second audio signal, received from an audio capture device communicatively coupled to the computing device, to the keyword detector producing a second indication of whether the one or more words designed to activate the voice command processing is present in the second audio signal; means for determining whether to activate the voice command processing based upon both the first and second indications of whether the one or more words are present; and means for selectively activating the voice command processing of the device based upon the determination.

In Example 26, the subject matter of Example 25 includes, wherein the first audio signal is audio from a communications application that originated from one or more remote participants.

In Example 27, the subject matter of Examples 25-26 includes, wherein the first audio signal is copied and wherein a first copy is submitted to the keyword detector and the second copy is caused to be played through an output device communicatively coupled to the computing device.

In Example 28, the subject matter of Examples 25-27 includes, wherein the means for determining whether to activate the voice command processing based upon both the first and second indications comprises: means for activating the voice command processing when the first indication indicates that the one or more words were not present and the second indication indicates that the one or more words were present.

In Example 29, the subject matter of Examples 25-28 includes, wherein the means for determining whether to activate the voice command processing based upon both the first and second indications comprises: means for refraining from activating the voice command processing when the first indication and the second indication both indicate that the one or more words were present.

In Example 30, the subject matter of Examples 25-29 includes, wherein the means for determining whether to activate the voice command processing based upon both the first and second indications comprises: means for refraining from activating the voice command processing when the first indication indicates that the one or more words were present and the second indication indicates that the one or more words were not present.

In Example 31, the subject matter of Example 30 includes, means for determining, based upon the first indication indicating that the one or more words were present and the second indication indicating that the one or more words were not present, that an echo canceller is active; and responsive to determining that the echo canceller is active, means for adjusting a digital signal processing setting of a communications application to compensate for the echo canceller.

In Example 32, the subject matter of Examples 25-31 includes, wherein the first audio signal is sent to an output device communicatively coupled to the one or more processors and the second audio signal is received from an input device communicatively coupled to the one or more processors.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:

1. A computing device that verifies an intent of a user to activate voice command processing of the computing device, the computing device comprising:
   a processor;
   a memory comprising instructions, which when executed by the processor, causes the processor to perform operations comprising:
      submitting a first audio signal to a keyword detector; the keyword detector producing a first indication of whether one or more words designed to activate the voice command processing are detected in the first audio signal;
      submitting a second audio signal, received from an audio capture device communicatively coupled to the computing device, to the keyword detector producing a second indication of whether the one or more words designed to activate the voice command processing are detected in the second audio signal, the second audio signal captured contemporaneously to playout of the first audio signal;

comparing the values of both the first and second indications of whether the one or more words are present; and determining not to activate the voice command processing of the computing device based upon a determination that the comparison of the values of both the first and second indications indicate the one or more words are present in both the first and second audio signals.

2. The computing device of claim 1, wherein the first audio signal is audio from a communications application that originated from one or more remote participants.

3. The computing device of claim 1, wherein the operations further comprise copying the first audio signal and submitting a first copy to the keyword detector and a second copy is caused to be played through an output device communicatively coupled to the computing device.

4. The computing device of claim 1, wherein the operations further comprise:

activating the voice command processing of the computing device based upon a determination that the comparison of the values of both the first and second indications indicate that the one or more words were not present in the first audio signal and the one or more words were present in the second audio signal.

5. The computing device of claim 1, wherein the operations further comprise:

determining not to activate the voice command processing based upon a determination that the comparison of the values of both the first and second indications indicate that the one or more words were present in the first audio signal and the one or more words were not present in the second audio signal.

6. The computing device of claim 5, wherein the operations further comprise:

determining, based upon the first indication indicating that the one or more words were present and the second indication indicating that the one or more words were not present, that an echo canceller is active; and responsive to determining that the echo canceler is active, adjusting a digital signal processing setting of a communications application to compensate for the echo canceler.

7. The computing device of claim 1, wherein the operations further comprise sending the first audio signal to an output device communicatively coupled to the computing device and receiving the second audio signal from an input device communicatively coupled to the processor.

8. The computing device of claim 1, wherein the second audio signal is captured contemporaneously to playout of the first audio signal by being captured within a determined time window of the playout of the first audio signal.

9. The computing device of claim 8, wherein the determined time window is a characteristic feedback window.

10. A method for verifying an intent of a user to activate voice command processing of a device, the method comprising:

using one or more processors of a computing device:

submitting a first audio signal to a keyword detector, the keyword detector producing a first indication of whether one or more words designed to activate the voice command processing are detected in the first audio signal;

submitting a second audio signal, received from an audio capture device communicatively coupled to the computing device, to the keyword detector producing a second indication of whether the one or more words designed to activate the voice command processing are detected in the second audio signal, the second audio signal captured contemporaneously to playout of the first audio signal;

comparing the values of both the first and second indications of whether the one or more words are present; and determining not to activate the voice command processing of the computing device based upon a determination that the comparison of the values of both the first and second indications indicate the one or more words are present in both the first and second audio signals.

11. The method of claim 10, wherein the first audio signal is audio from a communications application that originated from one or more remote participants.

12. The method of claim 10, wherein the first audio signal is copied and wherein a first copy of the first audio signal is submitted to the keyword detector and a second copy of the first audio signal is caused to be played through an output device communicatively coupled to the computing device.

13. The method of claim 10, further comprising:

determining, based upon the first indication indicating that the one or more words were present and the second indication indicating that the one or more words were not present, that an echo canceller is active; and responsive to determining that the echo canceler is active, adjusting a digital signal processing setting of a communications application to compensate for the echo canceler.

14. The method of claim 10, wherein the first audio signal is sent to an output device communicatively coupled to the one or more processors and the second audio signal is received from an input device communicatively coupled to the one or more processors.

15. The method of claim 10, wherein the second audio signal is captured contemporaneously to playout of the first audio signal by being captured within a determined time window of the playout of the first audio signal.

16. The method of claim 15, wherein the determined time window is a characteristic feedback window.

17. A computing device that verifies an intent of a user to activate voice command processing of the computing device, the computing device comprising:

means for submitting a first audio signal to a keyword detector, the keyword detector producing a first indication of whether one or more words designed to activate the voice command processing are detected in the first audio signal;

means for submitting a second audio signal, received from an audio capture device communicatively coupled to the computing device, to the keyword detector producing a second indication of whether the one or more words designed to activate the voice command processing is are detected in the second audio signal, the second audio signal captured contemporaneously to playout of the first audio signal;

means for comparing the values of both the first and second indications of whether the one or more words are present; and means for determining not to activate the voice command processing of the computing device based upon a determination that the comparison of the values of both the first and second indications indicate the one or more words are present in both the first and second audio signals.

18. The computing device of claim 17, wherein the first audio signal is audio from a communications application that originated from one or more remote participants.

19. The computing device of claim 17, wherein the first audio signal is copied and wherein a first copy of the first audio signal is submitted to the keyword detector and a second copy of the first audio signal is caused to be played through an output device communicatively coupled to the computing device.

20. The computing device of claim 17, wherein the second audio signal is captured contemporaneously to playout of the first audio signal by being captured within a determined time window of the playout of the first audio signal.

21. The computing device of claim 20, wherein the determined time window is a characteristic feedback window.

\* \* \* \* \*